July 2, 1957  R. W. METZE, JR., ET AL  2,797,605
IDENTICAL TWO-PART HEADED FASTENER HAVING ENGAGEABLE TEETH
Filed July 7, 1955  2 Sheets-Sheet 1
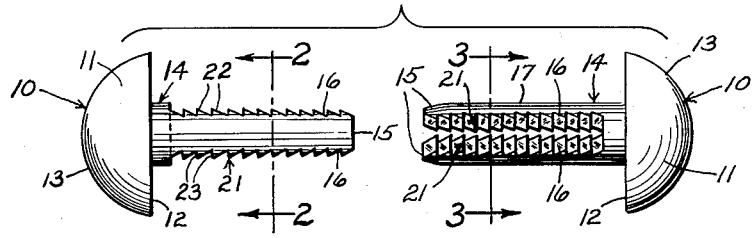
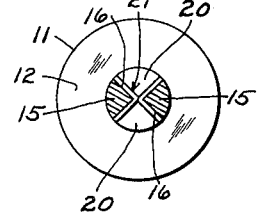
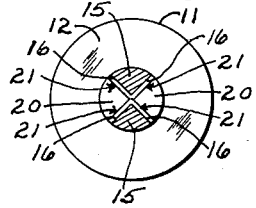
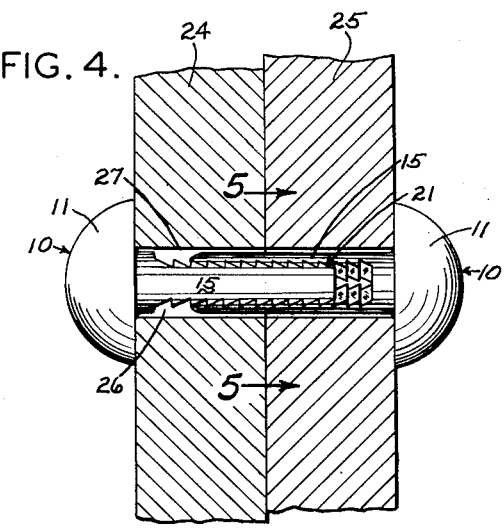
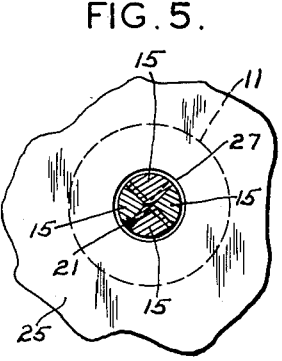
INVENTORS
ROBERT W. METZE JR.
AND ROBERT J. REISE
BY Terry & Cohn
ATTORNEYS July 2, 1957   R. W. METZE, JR., ET AL   2,797,605
IDENTICAL TWO-PART HEADED FASTENER HAVING ENGAGEABLE TEETH
Filed July 7, 1955   2 Sheets-Sheet 2

INVENTORS
ROBERT W. METZE JR.
AND ROBERT J. REISE
BY Terry & Cohn
ATTORNEYS

_United States Patent Office_ 2,797,605
Patented July 2, 1957

2,797,605

IDENTICAL TWO-PART HEADED FASTENER HAVING ENGAGEABLE TEETH

Robert W. Metze, Jr., Chicago, Ill., and Robert J. Reise, St. Louis, Mo.

Application July 7, 1955, Serial No. 520,447

4 Claims. (Cl. 85—4)

This invention relates generally to improvements in a fastener, and more particularly to improvements in a quickly connectible two-part fastener of rivet type.

It is an important object of this invention to realize a two part fastener that can be quickly and easily connected, and that can be utilized to retain elements in assembly without requiring fastener bores of a particular dimension in order to assure connection.

Another important objective is achieved by the shank structure of the fastening elements of the two part fastener, the shank of each element consisting of a plurality of sections spaced laterally apart a distance to receive the shank sections of the other element, and an interconnecting means on the shank sections adapted to lock the fastener in assembly. Other important advantages are realized by the shank structure which prevents axial displacement of the fastening elements, and assures complete and positive connection at all times.

Still another important object is realized by a fastener in which the component parts or fastening elements may be of the same construction, thus affording economy in manufacture.

Yet another important objective is realized by the fastener in that the fastening elements may be made from various suitable materials, such as metal or plastic, depending upon the particular field of usage. These fastening elements are produced as articles of manufacture that are simple and durable in construction.

Another important object is realized by the shank structure of the fastening elements which permits the elements to be easily assembled by a simple, relatively inward axial displacement of the shanks to afford operative interfitting connection of the shank sections.

Another important objective is realized by the quickly connectible two-part member in that the shanks and heads may be provided with a longitudinal axial bore, which enables the two-part member to be utilized as a grommet.

The foregoing and numerous other objects and advantages of the invention will more clearly appear from the following detailed description of a preferred embodiment, and several modifications, particularly when considered in connection with the accompanying drawings, in which:

Fig. 1 is a side elevational view showing the fastening elements of the two-part fastener in aligned, yet disassembled position;

Fig. 2 is a view in cross section of one fastening element as seen along line 2—2 of Fig. 1;

Fig. 3 is a view in cross section of the other fastening element as seen along line 3—3 of Fig. 1;

Fig. 4 is a fragmentary view, in partial cross section, showing the two-part fastener in operative position retaining two plates;

Fig. 5 is a fragmentary view, partly in cross section, as seen along line 5—5 of Fig. 4;

Figure 6:
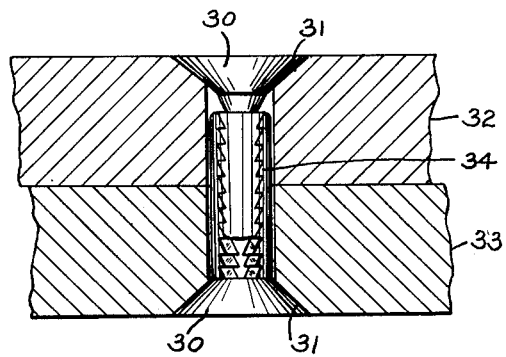
Fig. 6 is a fragmentary view, in partial cross section,
showing a modified form of the two-part fastener in operative countersunk position retaining two plates.

Referring now by characters of reference to the drawings, and to the particular structure of the two-part fastener shown in Figs. 1–5, it is apparent that the fastener consists of a pair of fastening elements, generally indicated at 10, adapted to be quickly and easily interfitted to provide a positive connection in a manner which is later fully described in detail. These fastening elements 10 are of identical construction, and hence afford a structure that is economical to manufacture and convenient to utilize. Depending upon the field of usage, the fastening elements 10 may be made advantageously as an article of manufacture from a variety of suitable materials, such as plastic or metal.

One of the fastening elements 10 will now be described in detail as to its structure. However, since each of the fastening elements 10 in the preferred embodiment of the invention is of the same construction, the description of the structural arrangement of one such element 10 will serve to describe adequately the other cooperating element 10. For completeness and clarity, the numerals used to indicate the various structural features of one fastening element 10 are also used to indicate the corresponding features of the other fastening element 10.

Each of fastening elements 10 includes a head 11 having a flat, inner abutment surface 12, and a rounded substantially arcuate outer surface 13, and includes an integral elongate shank, generally indicated at 14, extending outwardly from the center of abutment surface 12.

The shank 14 of each fastening element 10 consists of a plurality of shank sections 15 spaced apart laterally a distance to receive the shank sections 15 of the other shank 14 therebetween. In the preferred embodiment of the invention shown, the shank 14 consists of a pair of shank sections 15 arranged in relatively opposed relationship, separated for a considerable distance along the longitudinal axis of the shank. The purpose of such separation will later appear.

Each of shank sections 15 is defined by longitudinal lateral margins 16 arranged in angular relation, and by an arcuate outer margin 17. It appears from the drawing that each of shank sections 15 constitutes substantially a quadrant in cross section in which the lateral margins 16 extend radially outwardly and are disposed at right angles to one another.

Since the shank sections 15 of each shank 14 constitute opposed quadrants, the shank sections 15 form opposed, longitudinal, lateral recesses 20 (Figs. 2 and 3) which are particularly adapted to receive the quadrant-shaped shank sections 15 of the other shank 14. These recesses 20 are defined by the lateral margins 16 of sections 15.

Formed on lateral margins 16 are a plurality of tooth formations generally indicated at 21, the tooth formations providing shoulders extending laterally outwardly from and radially outwardly across the width of margins 16, and consisting of camming edges 22 inclined in a direction toward the head 11 of the respective fastening element 10, and of angularly related abutment edges 23.

In assembly, the shank sections 15 of one fastening element 10 interfit the recesses 20 of the other fastening element 10. To secure elements 10 of the two part fastener, the shanks 14 are axially aligned endwise with the shank sections 15 of one element 10 opposite the recesses 20 of the other fastening element 10. Then, the shanks 14 are displaced axially inwardly so that the shank sections 15 of each shank interfit the recesses 20 formed by the shank sections 15 of the other shank. As the shank sections 15 are interfitted in the manner above described, the tooth formations 21 of adjacent sections 15 engage, the formations 21 riding up and over camming edges 22. The shank sections 15 have sufficient resiliency to permit this result. When the fastening elements 10 are moved to the position desired, the abutment edges 23 will operatively inter-engage to prevent axial displacement in a direction tending to separate fastening elements 10. It is seen that shank sections 15 should have sufficient resilience to permit a slight outward expansion upon connection.

Fig. 4 illustrates the two part fastener in its normal operative position connecting together elements or plates 24 and 25. The fastening elements 10 are located in an aperture 26 formed in plates 24 and 25. One of the elements 10 has its shank 14 moved into aperture 26 until its head 11 abuts plate 24, the other fastening element 10 being moved into the opposite end of aperture 26 until its head 11 abuts plate 25. The shank sections 15 are disposed in axial endwise alignment in the manner described above, and are moved together into an operatively interfitting relation so that the tooth formations 21 prevent axial displacement of fastening elements 10.

It will be particularly noted that wall 27 defining aperture 26 in plates 24—25 need not engage shanks 14 of fastening elements 10 to assure connection of elements 10 at all times. The size of aperture 26 is limited only by the size of heads 11 on fastening elements 10, i. e., the heads 11 must engage the plates 24 and 25. The particular structure and interconnection of shank sections 15 prevent any relatively transverse displacement of the shanks 14 which would or might cause release of tooth formations 21.

A modified form of the two-part fastener is shown by Fig. 6 in which the heads 30 are frusto-conical in shape and adapted to seat in compatible recesses 31 formed in plates 32 and 33. In this countersunk arrangement, the heads 30 are disposed flush with the outer surfaces of the plates. The shanks 34 of the fastener are the same construction as those previously described in detail with respect to Figs. 1–5.

Figure 7:
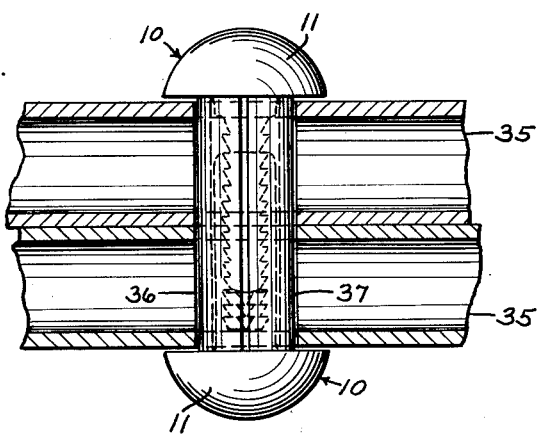
Fig. 7 is a fragmentary view, in partial cross section, showing a modified form of connection of the two-part fastener.

Fig. 7 discloses another type of connection that utilizes the two-part fastener shown in Figs. 1–5. The members 35 connected in Fig. 7 are tubular as is shown in cross section. These tubular members 35 are provided with an aperture 36 which is adapted to receive a split sleeve 37, the sleeve 37 extending slightly outwardly from each side of the tubular members 35. The sleeve 37 serves as a spacer for the two-part fastener in that the heads 11 abut the ends of the sleeve 37, and serves as a bearing for tubular members 35 upon relative movement about the axis of the sleeve 37. As noted before, the sleeve 37 is split to permit an expansion to accommodate the outward expansion of the shank sections incident to connection of the fastening elements 10.

Figure 8:
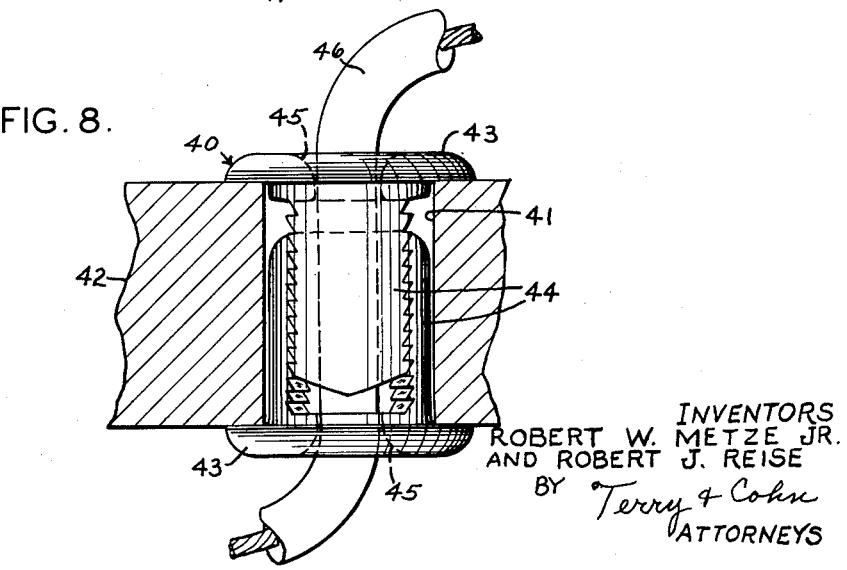
Fig. 8 is a fragmentary view, in partial cross section, showing another modified form of the two-part member adapted to be utilized as a grommet.

Fig. 8 discloses a quickly connectible two-part device 40 utilized as a grommet in an aperture 41 formed in a plate 42. Each element of device 40 includes a head 43, and a shank 44 consisting of a plurality of spaced sections. These shank sections include lateral margins having teeth in the manner previously described. The elements of device 40 are interconnected by the teeth in the same manner. However, an axial bore 45 is provided centrally along shanks 44 and heads 43 to accommodate a wire 46 passed therethrough.

Although the invention has been described by making detailed reference to a preferred embodiment, and several modifications, such detail is to be understood in an instructive, rather than in any restrictive sense, many variants being possible within the scope of the claims hereunto appended.

We claim as our invention:

1. In a two-part fastener made of resilient plastic material, a pair of identical fastening elements, each element comprising a head and a shank, each shank consisting of a plurality of shank sections spaced apart laterally a distance sufficient to embracingly receive the sections of the shank of the other fastening element therebetween, each of said shank sections including a surface which forms with the other shank sections, a shank periphery, said shank sections having radial margins angularly arranged relative to each other, and each of said radial margins in the vicinity of the terminal end of said shank section which is spaced from said head being provided with a plurality of tooth formations for a substantial portion of the shank length in the direction of said head, each tooth formation on said radial margins including a surface arranged at an acute angle to the longitudinal axis of the fastener and facing in a direction away from said head to facilitate insertion of the fastener shank sections into engagement with the shank sections of the other of said fastening element, and an abutment shoulder to underlie a surface of similar design on the complementary fastening element to resist separation movement of the two fastening elements, the overlapping portions of the shank sections of the two fastening elements in mounted position in a complementary work aperture presenting in that region a shank portion of substantially uniform cross section and presenting a substantially continuous outer periphery.

2. In a two-part fastener of the type set forth in claim 1 wherein each fastening element is provided with an axial bore centrally along the shank and head whereby said device is adapted for use as a pass-through grommet.

3. In a two-part fastener of the type set forth in claim 1 wherein the tips of the shank sections are relieved in a direction away from said head portion to facilitate their insertion into the work aperture of a complementary workpiece, and further, to facilitate the initial insertion of one fastener shank section into engagement with the other fastener shank sections.

4. In a two-part fastener of the type described in claim 1, wherein the peripheral wall portions of each of the shank sections is a segment of a circle and the overlapping portions of the shank sections of the two fastening elements in mounted position in a complementary work aperture present a substantially continuous circular outer periphery.

References Cited in the file of this patent
UNITED STATES PATENTS

| | | |
|---|---|---|
| 491,019 | Manson | Jan. 31, 1893 |
| 607,315 | Wingard | July 12, 1898 |
| 934,258 | Adams | Sept. 14, 1909 |
| 1,061,274 | Dodds | May 13, 1913 |
| 1,339,197 | Hemingway | May 4, 1920 |
| 1,418,314 | McBee | June 6, 1922 |
| 2,481,777 | Overly | Sept. 13, 1949 |